(12) United States Patent
Lee

(10) Patent No.: US 6,499,720 B1
(45) Date of Patent: Dec. 31, 2002

(54) FIREPROOF STRUCTURE OF A BALL VALVE

(76) Inventor: Jen-Chieh Lee, 47-2, Ju-Yi Rd., Hsi-Chi Li, Ta Chia Township Taichung Hsien (TW)

(*) Notice: Subject to any disclaimer, the term of this patent is extended or adjusted under 35 U.S.C. 154(b) by 0 days.

(21) Appl. No.: 09/919,632

(22) Filed: Aug. 2, 2001

(51) Int. Cl.[7] .................................. F16K 5/06
(52) U.S. Cl. ........................... 251/174; 251/180
(58) Field of Search ........................ 251/180, 181, 251/183, 170, 174

(56) References Cited

U.S. PATENT DOCUMENTS 4,318,420 A * 3/1982 Calvert ................... 251/174 X
6,302,373 B1 * 10/2001 Lee ........................ 251/315.11

* cited by examiner

Primary Examiner—Kevin Lee
(74) Attorney, Agent, or Firm—Harrison & Egbert

(57) ABSTRACT

A ball valve includes a valve body and an urging member. The valve body is formed of a valve block, and two leakproof rings. The urging member is formed of a movable block, a locating element, and an elastic element located by the locating element. The movable block is provided with two slots for locating the leakproof rings, and with two annular protruded edges. In the event of deformation of the leakproof rings, the leakproof rings are pushed by the elastic element to make contact with the valve block. In the event that the leakproof rings are melted by fire, the valve block is pressed against by the annular protruded edges, so as to minimize the leakage of the ball valve.

8 Claims, 16 Drawing Sheets

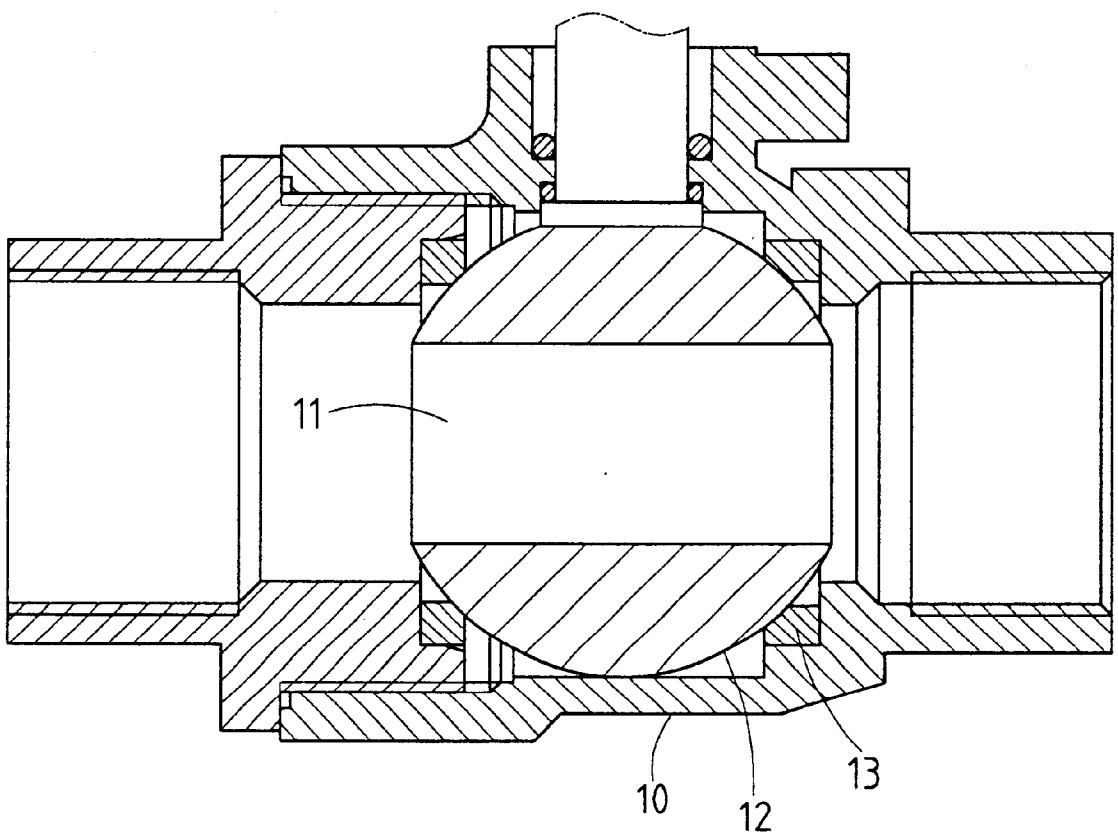
FIG.1-A PRIOR ART

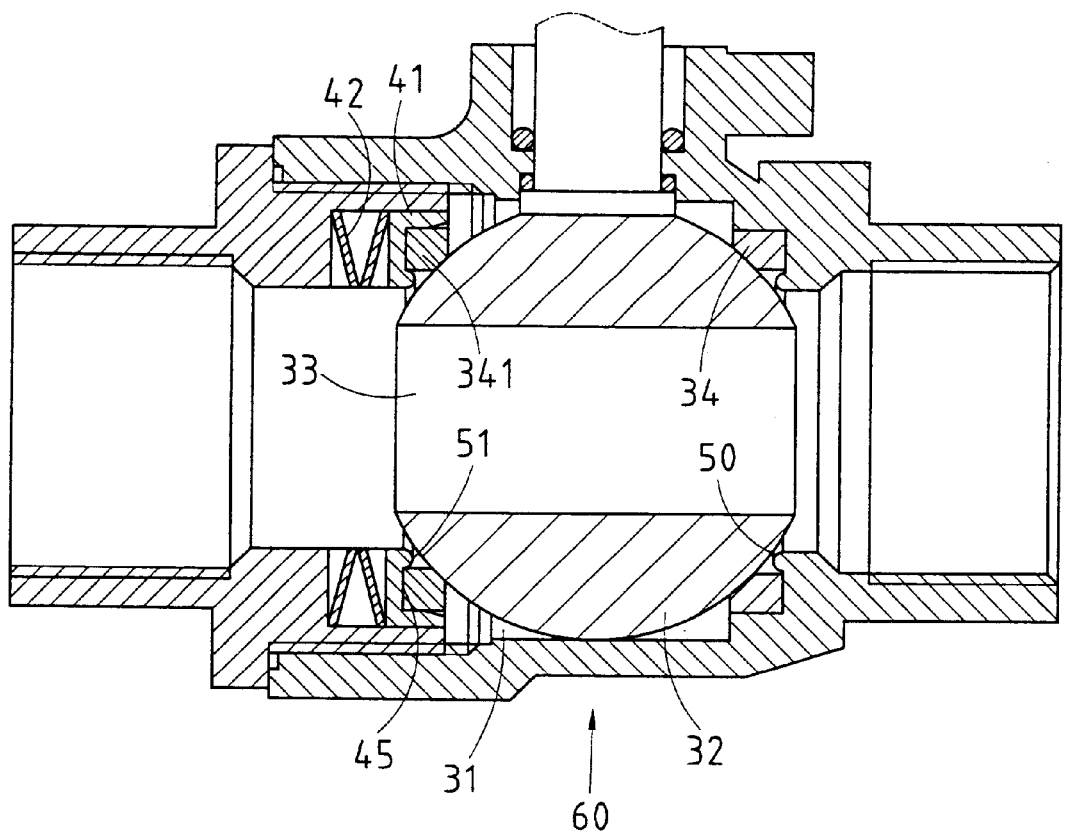
FIG.8-A

FIREPROOF STRUCTURE OF A BALL VALVE

BACKGROUND OF THE INVENTION

1. Field of the Invention

The present invention relates generally to a ball valve, and more particularly to a ball valve comprising a fireproof structure to minimize leak of the ball valve in case of fire.

2. Description of Related Art

As shown in FIGS. 1, 1A, 2, and 2A, the prior art ball valves comprise a valve body 10, a spherical body 12, and two leakproof rings 13. The spherical body 12 is provided with a channel 11. The leakproof rings 13 are susceptible to wear or deformation due to the mechanical friction between the leakproof rings 13 and the spherical body 12. In light of the damage or deformation of the leakproof rings 13, leak takes place between the spherical body 12 and the leakproof rings 13.

As shown in FIGS. 3 and 3A, another prior art ball valve comprises a valve body 20, a spherical body 21, two leakproof rings 22, and an urging member 23. As shown in FIG. 3A, the urging member 23 is formed of a movable block 24, an elastic element 25, and a locating member 26. The movable block 24 is provided in two sides thereof with a slot 27 for locating one of the leakproof rings 22. The movable block 24 is urged by the elastic element 25 so as to keep the spherical body 21 and the leakproof rings 22 in contact with each other. The leakproof rings 22 are made of Teflon and are vulnerable to deformation or meltage in the event of fire. The molten Teflon rings 22 are either attached to the spherical body 21 or carried away by the fluid flow, thereby resulting in the valve leak.

BRIEF SUMMARY OF THE INVENTION

The primary objective of the present invention is to provide a ball valve with a fireproof structure to overcome the deficiencies of the prior art ball valves described above.

The foregoing objective of the present invention is attained by the ball value comprising a valve body, a spherical valve block, two leakproof rings, and an urging member for keeping the spherical valve block in an intimate contact with the leakproof rings. The urging member is formed of a movable block, an elastic element, and a locating element. The movable black is provided with two slots for locating the leakproof rings, and two annular protruded edges located respectively in proximity of the leakproof rings. In the event of deformation of the leakproof rings, the reaction force of the elastic element pushes the leakproof rings to make contact with the valve block. In the event that the leakproof rings are melted, the valve block is pressed by the annular protruded edges, so as to minimize the valve leak.

The foregoing objective, features and functions of the present invention will be more readily understood upon a thoughtful deliberation of the following detailed description of the preferred embodiments of the present invention with reference to the accompanying drawings.

BRIEF DESCRIPTION OF THE SEVERAL VIEWS OF THE DRAWINGS

FIG. 1A shows another sectional view of the prior art ball valve as shown in FIG. 1.

FIG. 8A shows a schematic view of a sixth preferred embodiment of the present invention.

DETAILED DESCRIPTION OF THE INVENTION

Figure 1:
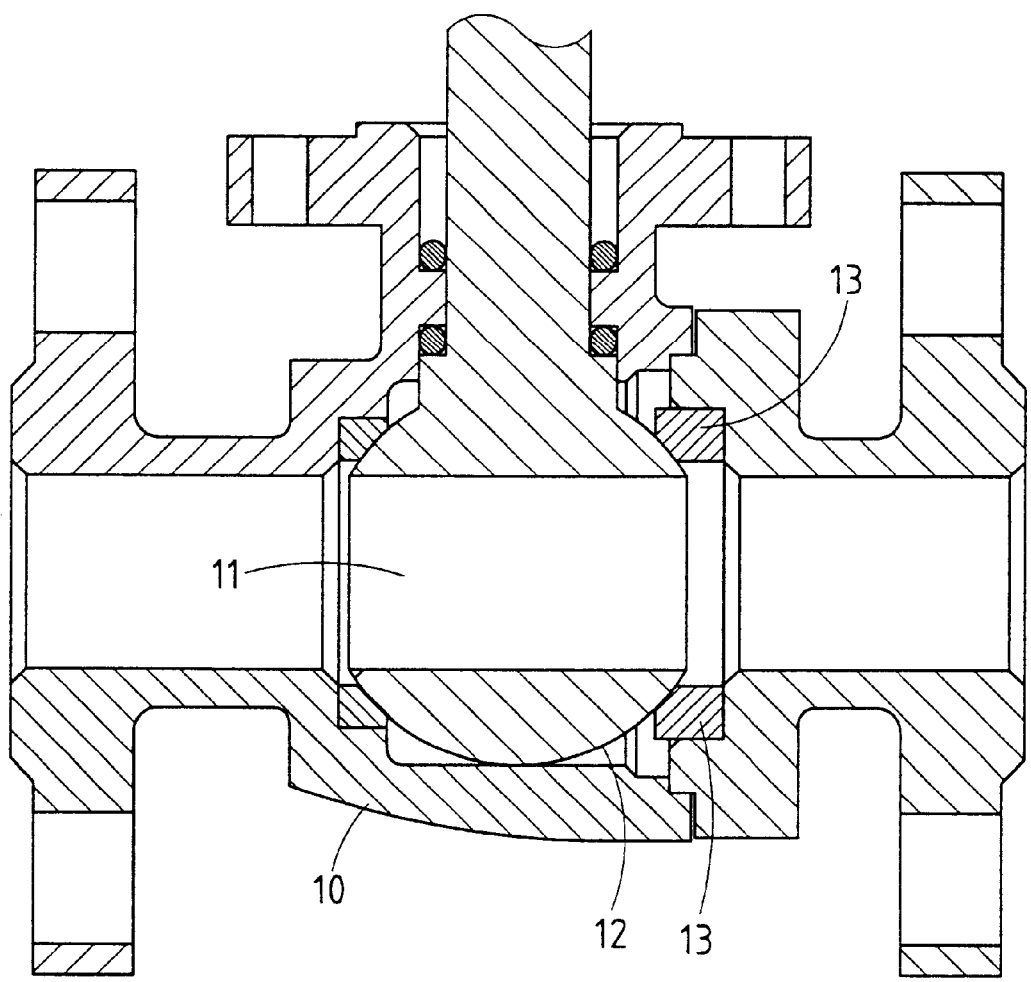
FIG. 1 shows a sectional view of a prior art ball valve.
Figure 2:
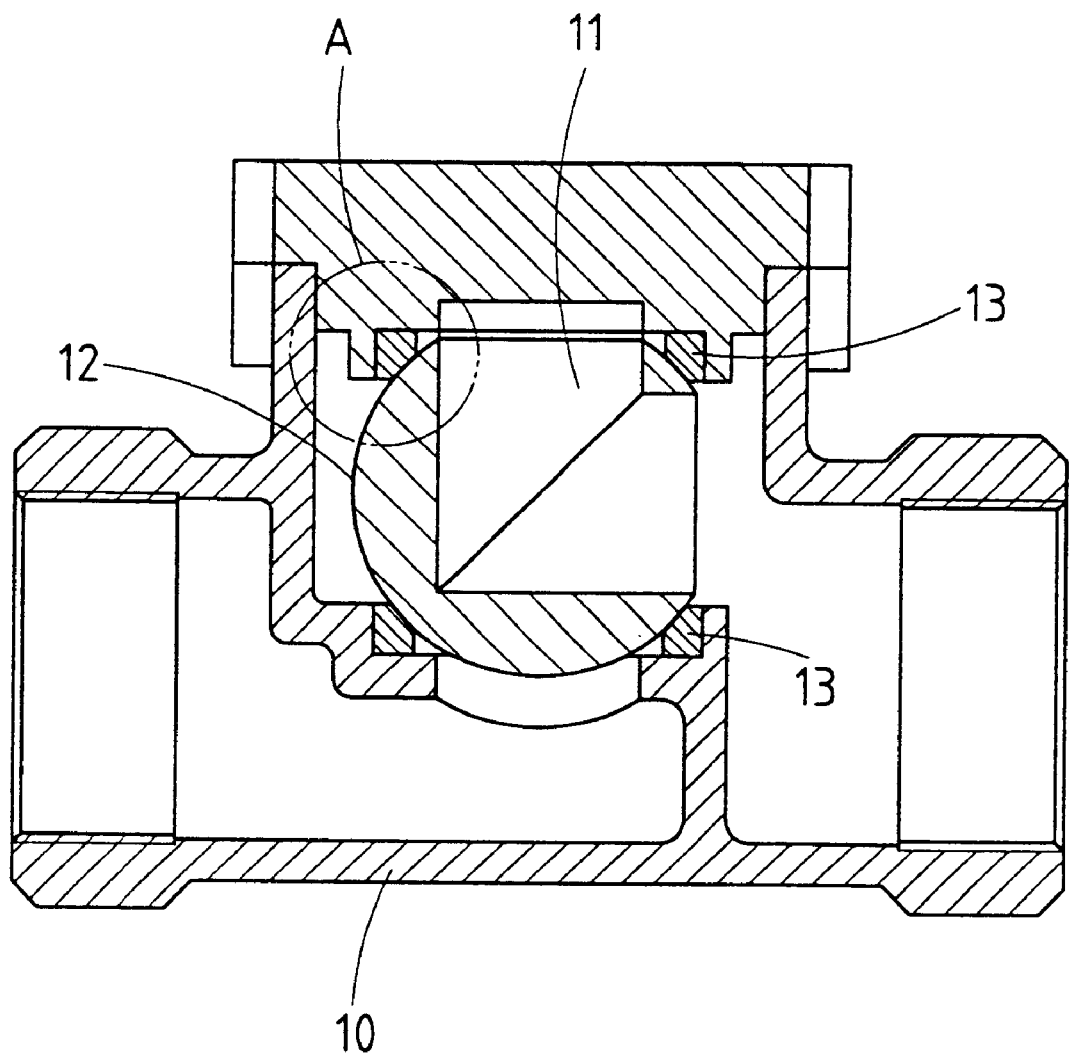
FIG. 2 shows a sectional view of another prior art ball valve.
Figure 2A:
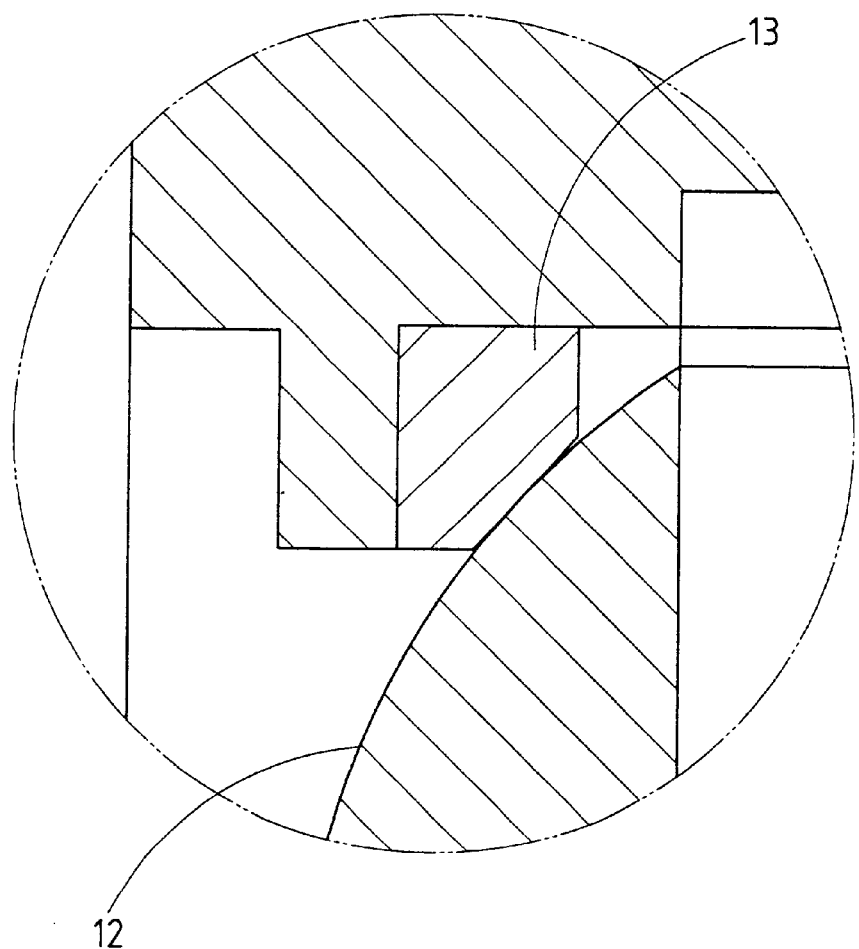
FIG. 2A shows an enlarged sectional view of a portion indicated by a circle "A" as shown in FIG. 2.
Figure 3:
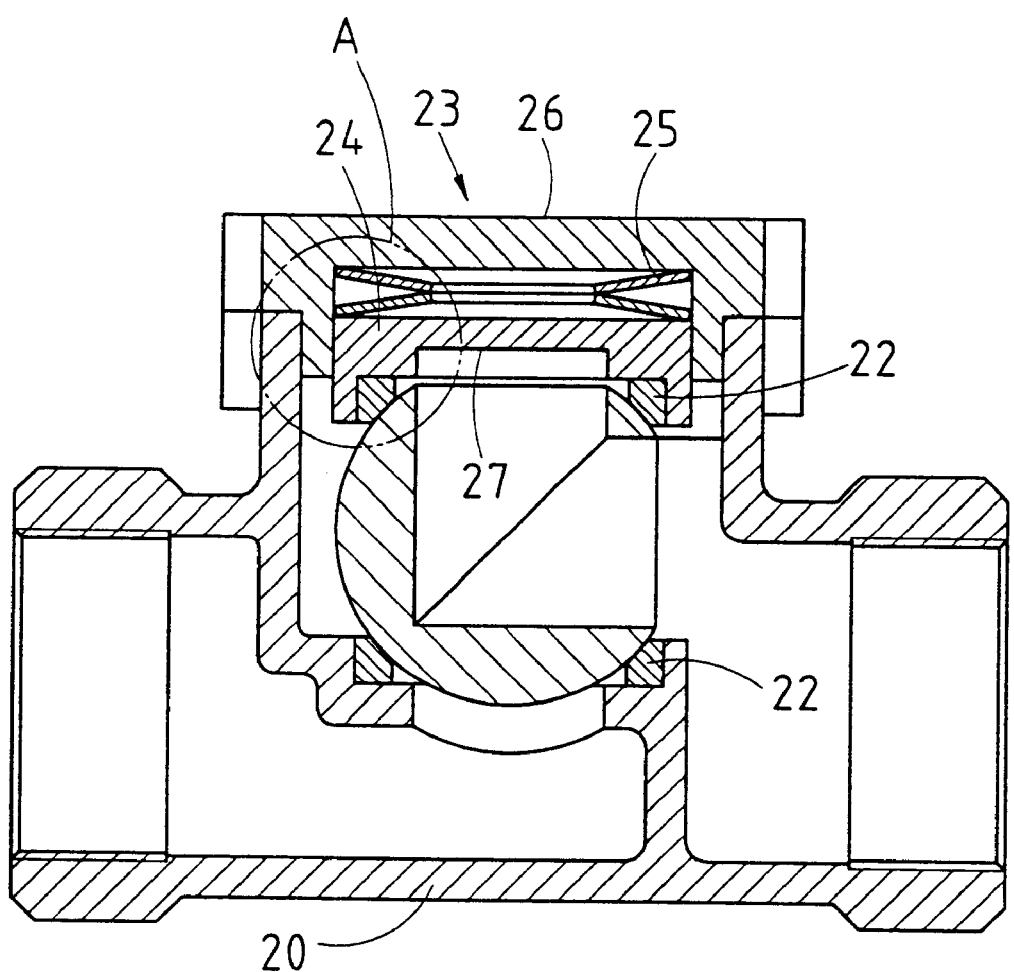
FIG. 3 shows a sectional view of still another prior art ball valve.
Figure 3A:
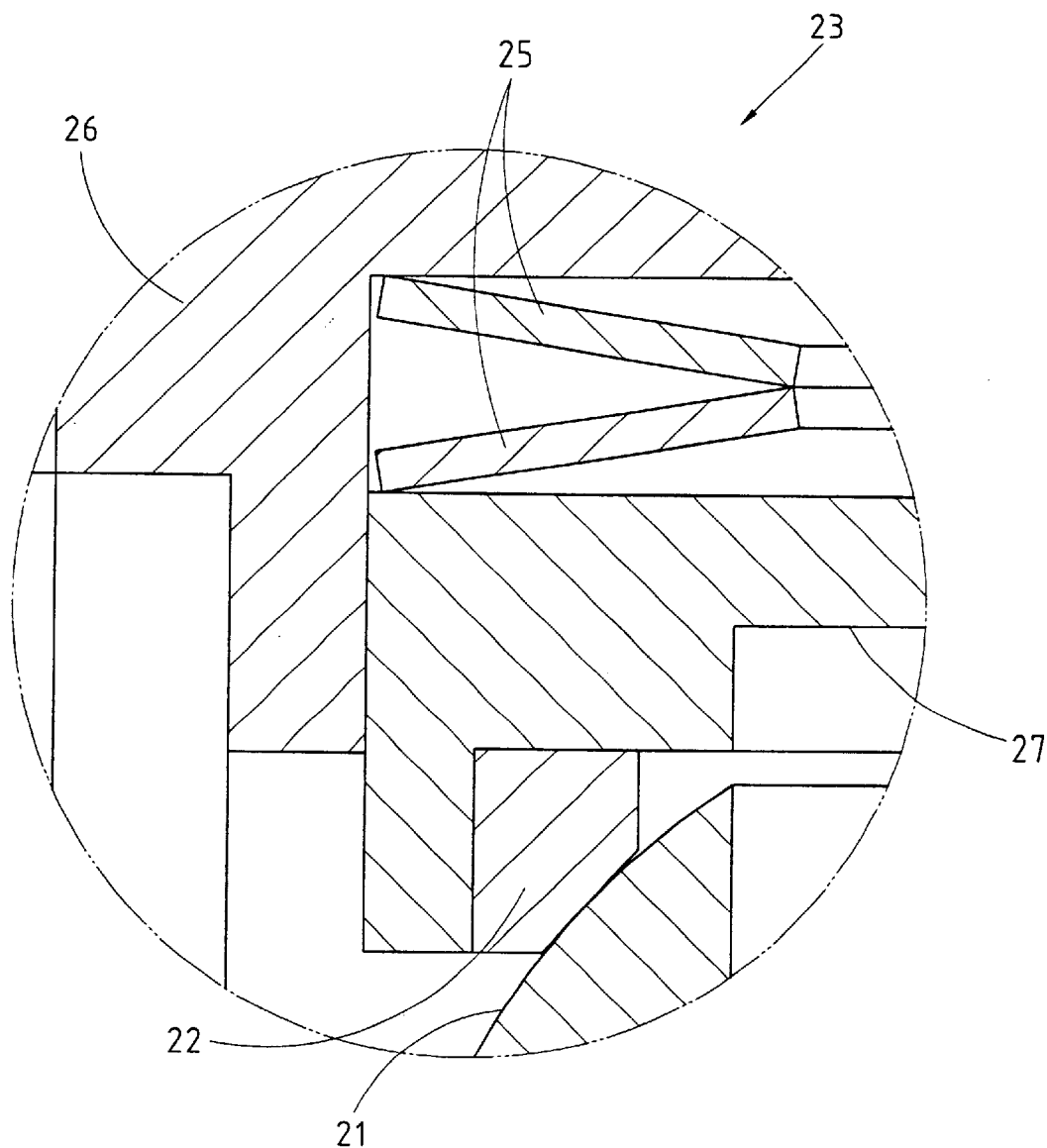
FIG. 3A shows an enlarged schematic view of a portion indicated by a circle "A" as shown in FIG. 3.

As shown in FIGS. 4–7, a ball valve of the present invention comprises a valve body 30 and an urging member 40.

The valve body 30 is provided in the interior with a receiving slot 31 in which a spherical valve block 32 is disposed. The valve block 32 is provided with a channel 33. The valve body 30 is further provided with two leakproof rings 34 and 341, which are disposed between the valve block 32 and the slot 31.

The urging member 40 is formed of a movable block 41, an elastic member 42, and a locating member 43. The locating member 43 is provided with a receiving slot 44 for accommodating the elastic element 42. The movable block 41 is provided with two slots 45 for accommodating the two leakproof rings 34 and 341. The movable block 41 is further provided with two annular protruded edges 50 and 51, which are respectively located in proximity of the leakproof ring 34,341.

Figure 4:
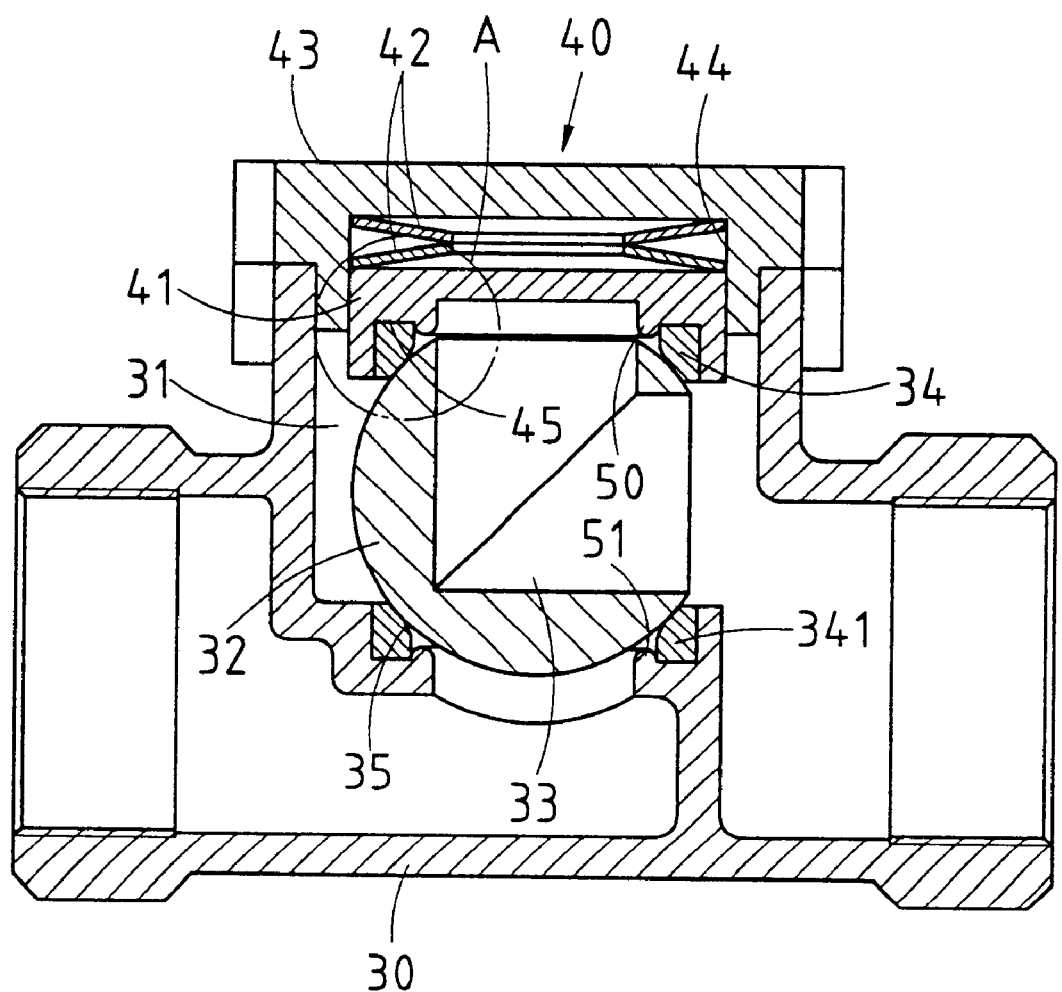
FIG. 4 shows a sectional view of a first preferred embodiment of the present invention.
Figure 4A:
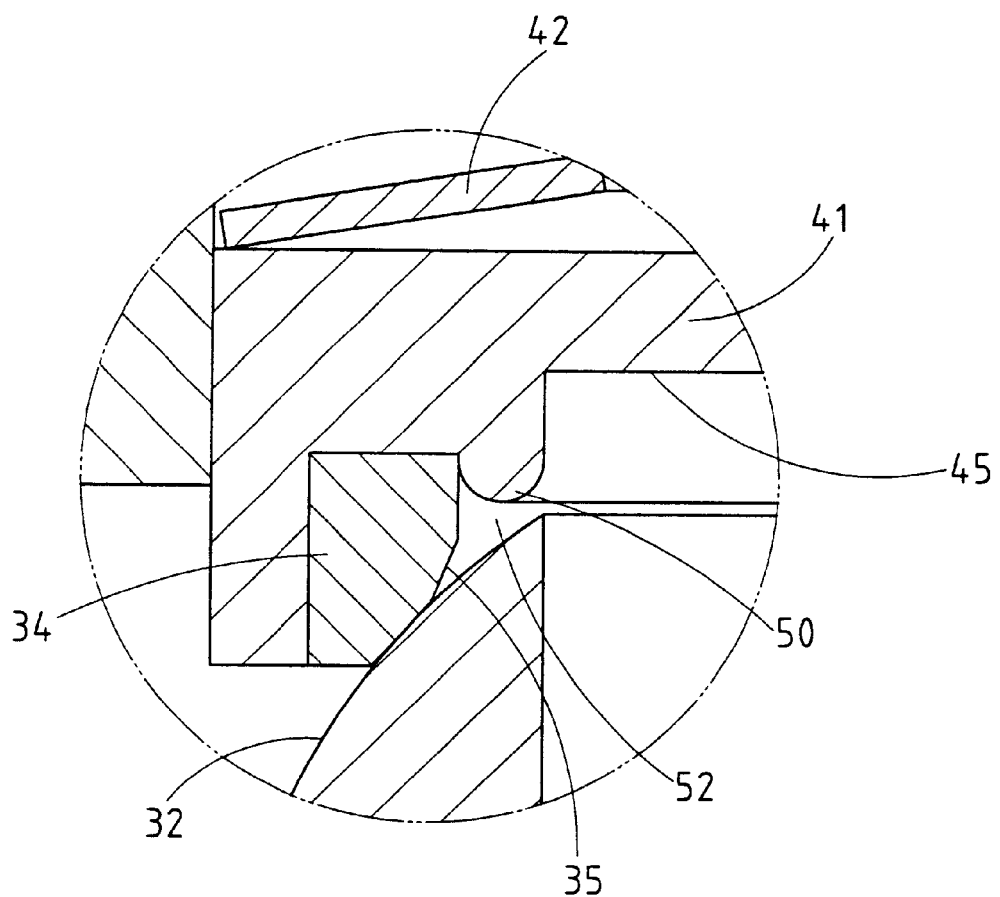
FIG. 4A shows an enlarged schematic view of a portion indicated by a circle "A" as shown in FIG. 4.
Figure 5:
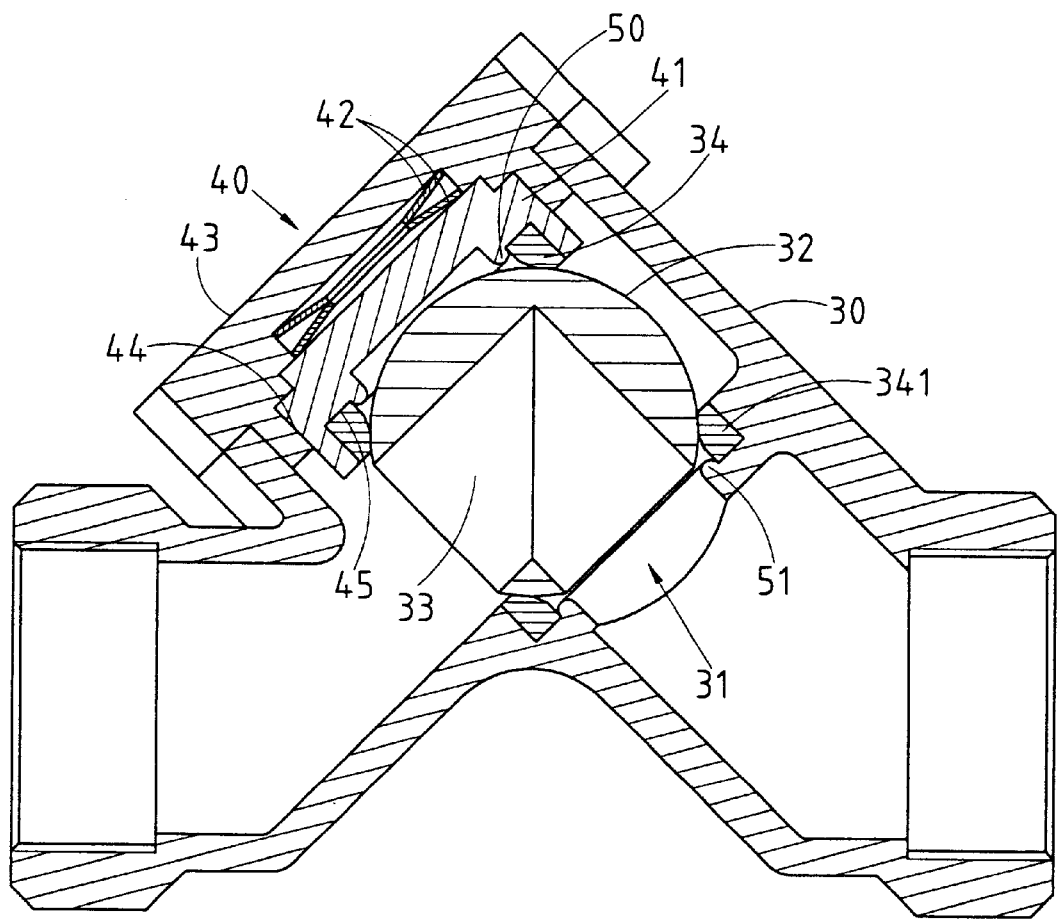
FIG. 5 shows a sectional view of a second preferred embodiment of the present invention.
Figure 6:
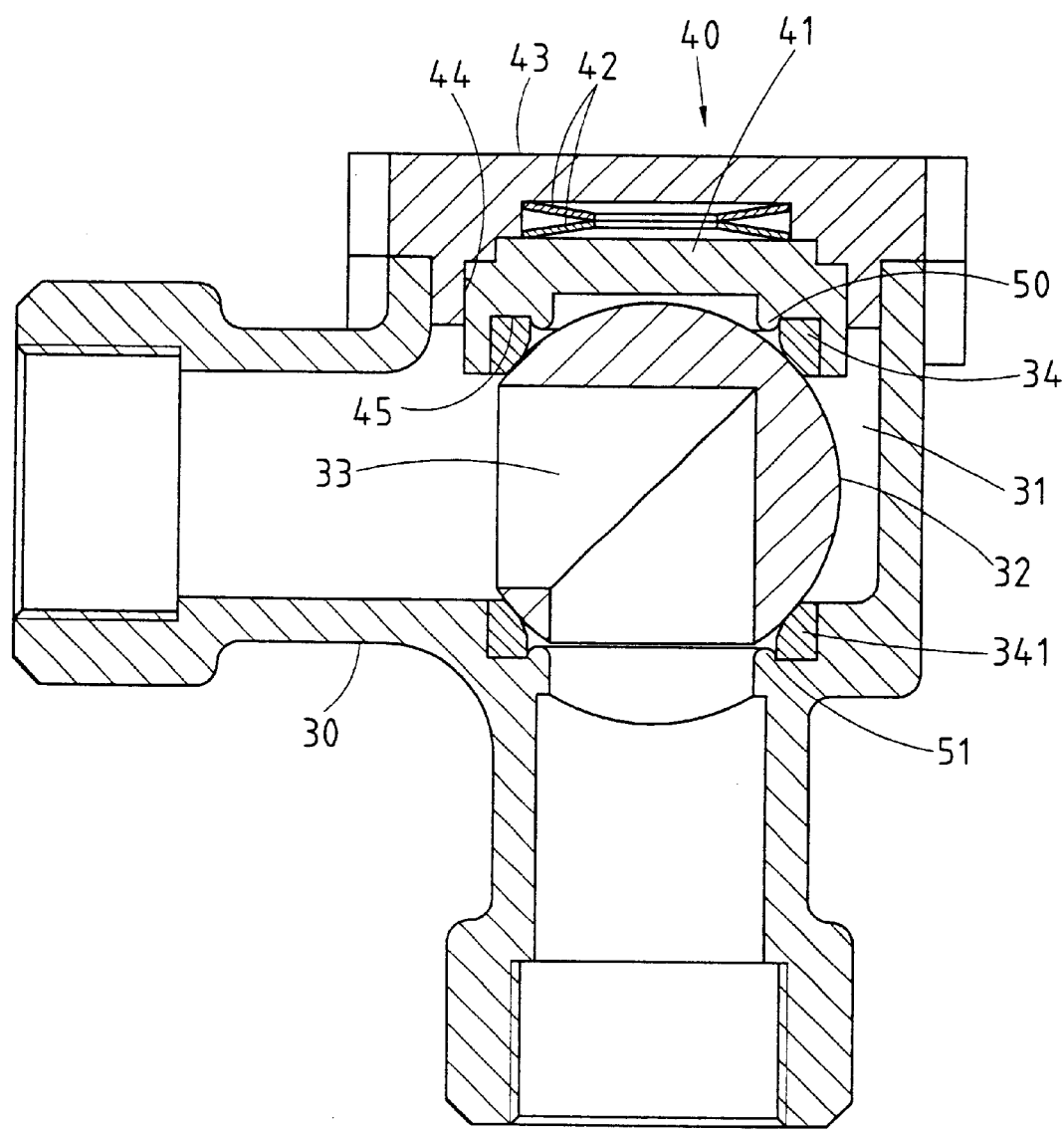
FIG. 6 shows a sectional view of a third preferred embodiment of the present invention.

As shown in FIG. 4, the valve body 30 is of a T-shaped construction. As shown in FIG. 5, the valve body 30 has a Y shape. As shown in FIG. 6, the valve body 30 is of an L-shaped construction.

As shown in FIG. 4, the annular protruded edge 50, 51 and the valve block 32 are provided therebetween with an arcuate contact area 52.

Figure 7:
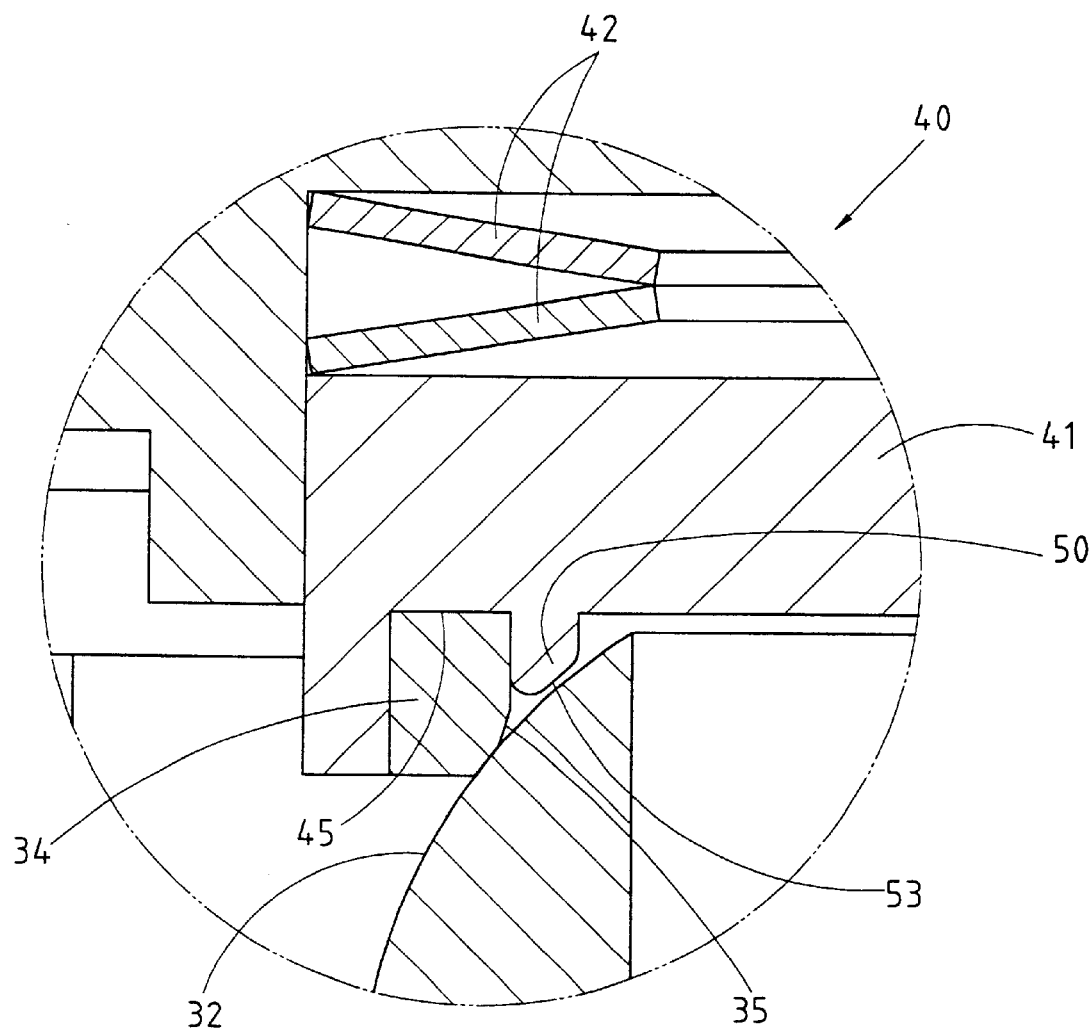
FIG. 7 shows a schematic view of a fourth preferred embodiment of the present invention.

As shown in FIG. 7. the annular protruded edge 50, 51 and the valve block 32 are provided therebetween with an inclined contact area 53.

As shown in FIGS. 4–7, the channel 33 of the valve block 32 has an L shape.

Figure 8:
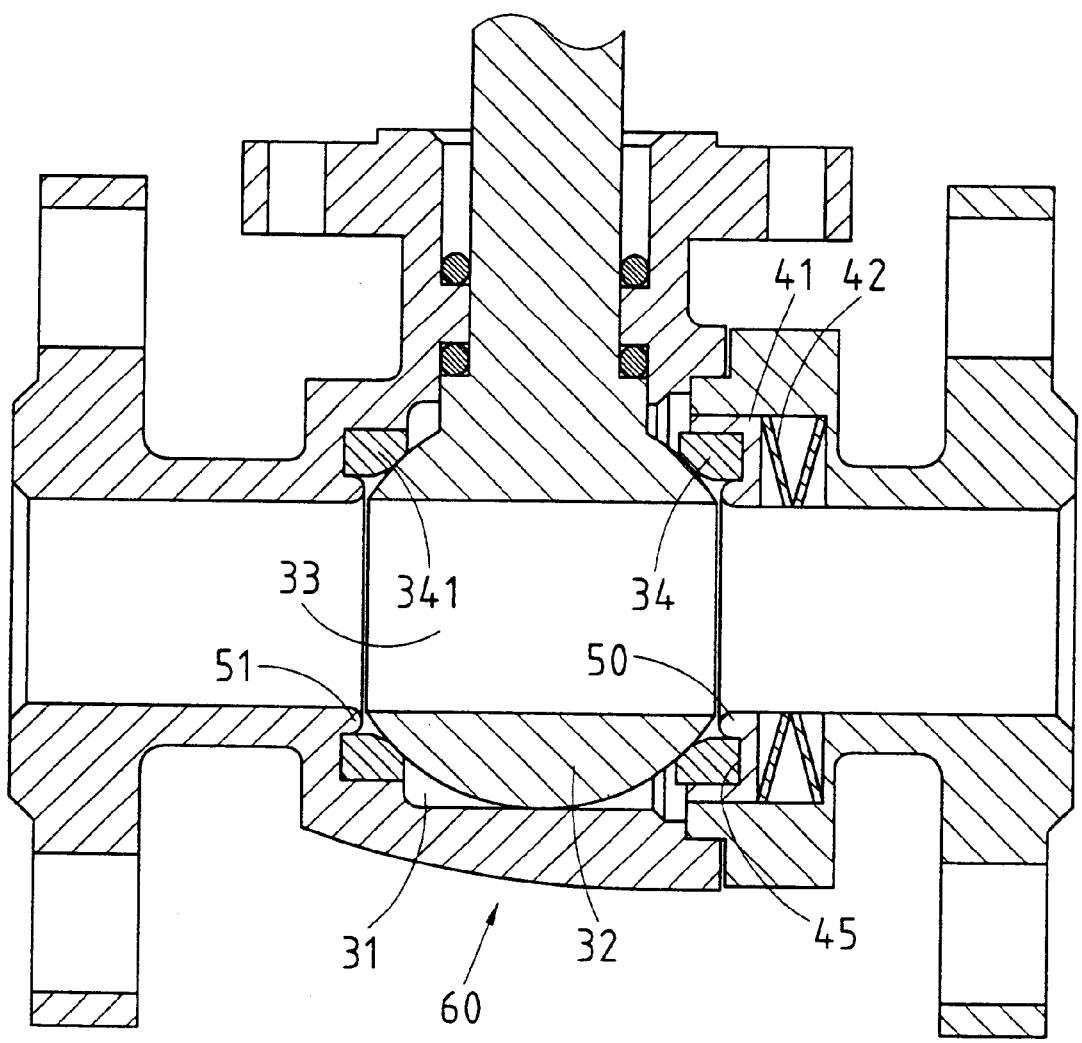
FIG. 8 shows a schematic view of a fifth preferred embodiment of the present invention.

As shown in FIG. 8, the channel 33 of the valve block 32 is linear.

As shown in FIGS. 8 and 8A, the annular protruded edges 50 and 51 are applicable to the conventional ball valves, such as Francis ball valve and locking ball valve.

As shown in FIG. 4, the valve body 30 is provided with a notch 35 which is located in proximity of the contact area between the valve block 32 and the leakproof ring 34 or 341. The notch 35 is intended to provide the leakproof rings 34 and 341 with an expansion space at the time when the leakproof rings 34 and 341 are caused by heat to expand.

Figure 9:
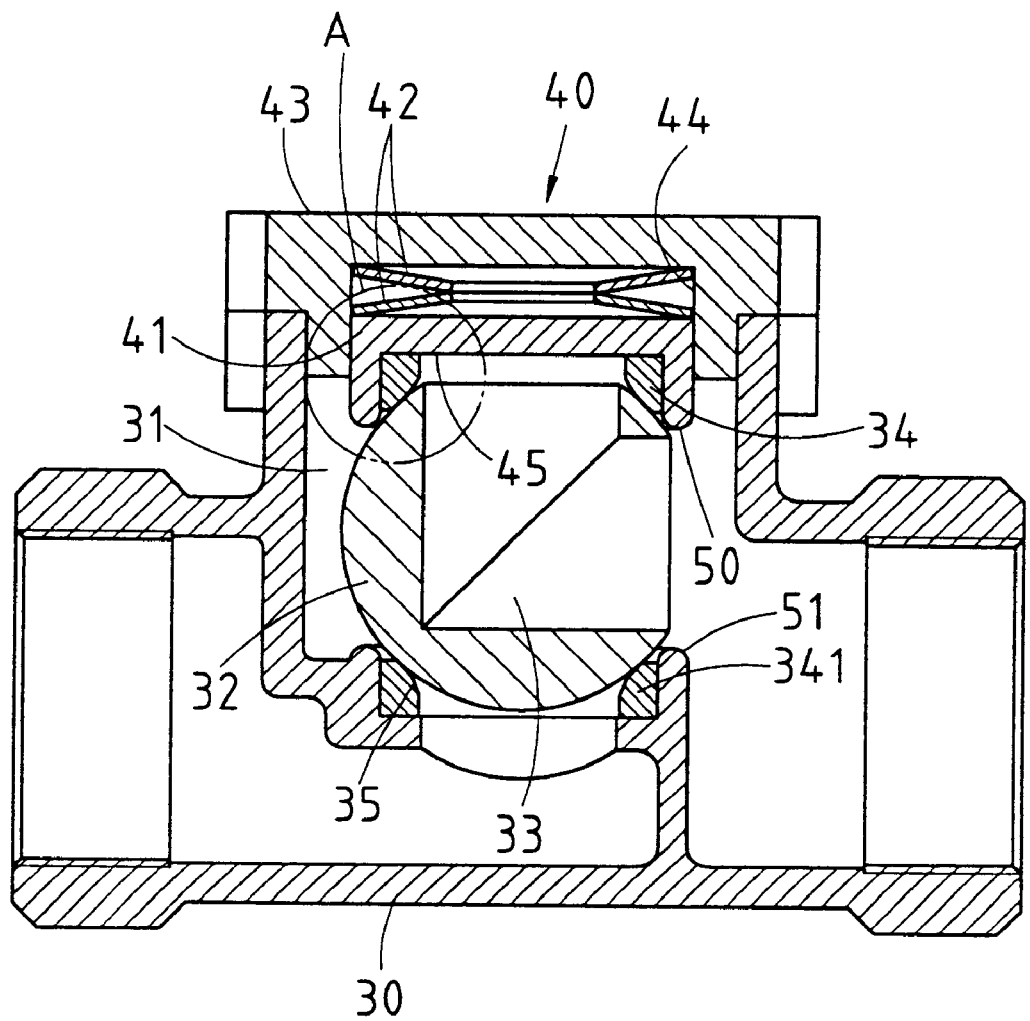
FIG. 9 shows a schematic view of a seventh preferred embodiment of the present invention.
Figure 9A:
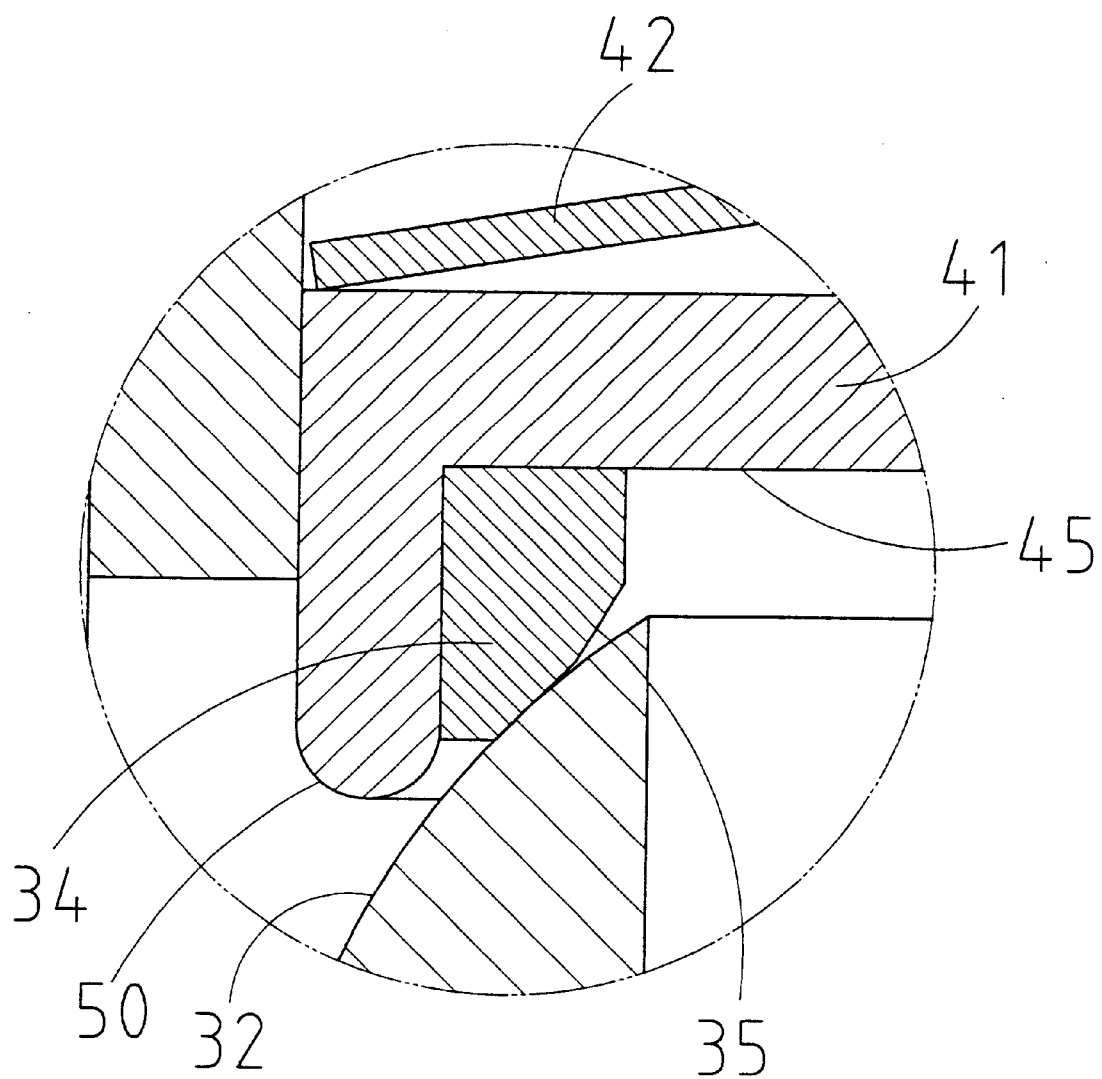
FIG. 9A shows an enlarged schematic view of a portion indicated by a circle "A" as shown in FIG. 9.
Figure 10:
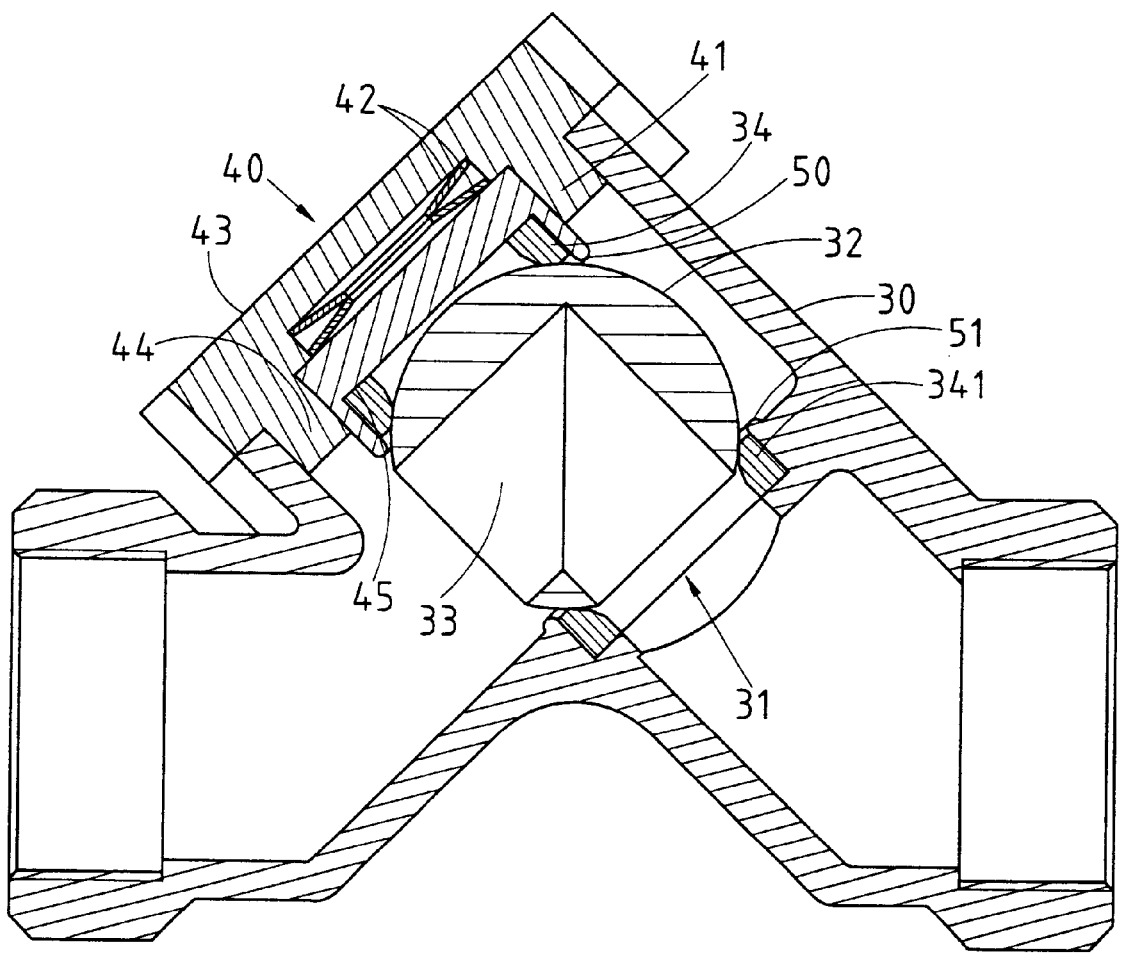
FIG. 10 shows a schematic view of an eighth preferred embodiment of the present invention.

As shown in FIGS. 9–10, the annular protruded edges 50 and 51 are located in proximity of the outer ring side of the leakproof rings 34 and 341.

In the event of the deformation of the leakproof rings 34 and 341, the reaction force of the elastic element 42 pushes the leakproof rings 34 and 341 to make contact with the valve block 32.

In the event that the leakproof rings 34 and 341 are melted by fire, the valve block 32 is pressed by the annular protruded edges 50 and 51, thereby minimizing the valve leak.

The embodiments of the present invention described above are to be regarded in all respects as being merely illustrative and not restrictive. Accordingly, the present invention may be embodied in other specific forms without deviating from the spirit thereof. The present invention is therefore to be limited only by the scope of the following claims.

I claim:

1. A ball valve comprising:

a valve body having a receiving slot in an interior thereof;

a spherical valve block desposed in said receiving slot of said valve body, said valve body having a channel extending therethrough;

a first leakproof ring disposed between said valve block and said receiving slot of said valve body;

an urging means formed of a movable block and a single elastic element and a locating member, said locating member having a receiving slot formed therein, said elastic element interposed between said movable block and an inner surface of said receiving slot of said locating element, said movable block having a slot formed therein; and a second leakproof ring received within said slot of said movable block, said movable block having a first annular protruded edge formed adjacent an interior surface of said second leakproof ring, said urging means for pressured contact between said interior surface of said second leakproof ring and an exterior surface of said valve block, said first annular protruded edge being spaced from said valve block when said second leakproof ring is in pressured contact with said valve block, said movable block having a second annular protruded edge in concentric relation to said first annular protruded edge, said second annular protruded edge formed adjacent an exterior surface of said second leakproof ring, said second annular protruded edge being flush with said second leakproof ring.

2. The ball valve of claim 1, said valve body having a T-shape.

3. The ball valve of claim 1, said valve body having a Y-shape.

4. The ball valve of claim 1, said valve body having an L-shape.

5. The ball valve of claim 1, said second leakproof ring having an arcuate-shaped surface in the pressured contact with said valve block.

6. The ball valve of claim 1, said second leakproof ring having an indented surface in the pressured contact with said valve block.

7. The ball valve of claim 1, said channel of said valve block being of an L-shaped construction.

8. The ball valve of claim 1, said channel of said valve block being of linear construction.

* * * * *